United States Patent
Hu et al.

(10) Patent No.: US 7,099,321 B2
(45) Date of Patent: Aug. 29, 2006

(54) SYMMETRIC DUAL-SLOT DATA HASH METHOD AND NETWORK SWITCHING APPARATUS USING SAME

(75) Inventors: Yeong-Chian Hu, Taichung (TW); Wei-Pin Chen, Taipei (TW)

(73) Assignee: VIA Technologies, Inc., Taipei (TW)

( * ) Notice: Subject to any disclaimer, the term of this patent is extended or adjusted under 35 U.S.C. 154(b) by 1023 days.

(21) Appl. No.: 10/133,429

(22) Filed: Apr. 29, 2002

(65) Prior Publication Data

US 2002/0163919 A1 Nov. 7, 2002

(30) Foreign Application Priority Data

May 3, 2001 (TW) .............................. 90110664 A

(51) Int. Cl.
*H04L 12/56* (2006.01)
(52) U.S. Cl. ...................................... 370/389; 370/428
(58) Field of Classification Search ............... 370/389, 370/392, 412, 428, 429; 711/216, 220, 221
See application file for complete search history.

(56) References Cited

U.S. PATENT DOCUMENTS 6,690,667 B1 * 2/2004 Warren ...................... 370/389
6,819,671 B1 * 11/2004 Chen et al. ................. 370/392

* cited by examiner

*Primary Examiner*—Derrick Ferris
(74) *Attorney, Agent, or Firm*—Rabin & Berdo, P.C.

(57) ABSTRACT

A symmetric dual-slot data hash method and a switching apparatus using the same having a first block and a second block of equal size for storing MAC addresses. The size of the dual-slot address table is p×2m with m is an integer, and p is 2 or a prime. The hash address comprises a higher address portion and a lower address portion. A CRC hash operation is performed to the MAC address by using the m-bit CRC function to obtain a hash value. Next, the highest bit of the hash value is removed and the remained bits are used as the lower address portion of the hash address. A dividend is set according to the m-th bit of the MAC address. After the dividend is divided by a divisor p to obtain a remainder, the remainder is set as a higher address portion of the hash address.

18 Claims, 8 Drawing Sheets

| MAC[23:12] | MAC[11] | CRC[10] | RES[0] | CRC[9:0] |
|---|---|---|---|---|
| 0 | 0 | 0 | 0 | X |
| 0 | 0 | 1 | 1 | X |
| 0 | 1 | 0 | 0 | X |
| 0 | 1 | 1 | 1 | X |

(830 = MAC[23:12], MAC[11], CRC[10]; 860 = {840: RES[0], 820: CRC[9:0]})

| | MAC[12] | MAC[11] | MAC[10] | MAC[9:0] | MAC address range |
|---|---|---|---|---|---|
| · · · · | 0 | 0 | 0 | X | 0 ~ 1K-1 |
| · · · · | 0 | 0 | 1 | X | 1K ~ 2K-1 |
| · · · · | 0 | 1 | 0 | X | 2K ~ 3K-1 |
| · · · · | 0 | 1 | 1 | X | 3K ~ 4K-1 |

FIG. 10

| | RES[2] | RES[1] | RES[0] | CRC[9:0] |
|---|---|---|---|---|
| | 0 | 0 | 0 | x |
| | 0 | 0 | 1 | x |
| | 0 | 1 | 0 | x |
| | 0 | 1 | 1 | x |
| | 1 | 0 | 0 | x |
| | 0 | 0 | 0 | x |
| | 0 | 0 | 1 | x |
| | 0 | 1 | 0 | x |
| | 0 | 1 | 1 | x |
| | 1 | 0 | 0 | x |

| MAC[23:14] | MAC[13] | MAC[12] | MAC[11] | CRC[10] |
|---|---|---|---|---|
| 0 | 0 | 0 | 0 | 0 |
| 0 | 0 | 0 | 0 | 1 |
| 0 | 0 | 0 | 1 | 0 |
| 0 | 0 | 1 | 1 | 1 |
| 0 | 0 | 1 | 0 | 0 |
| 0 | 0 | 1 | 1 | 1 |
| 0 | 1 | 1 | 1 | 0 |
| 0 | 1 | 0 | 0 | 1 |
| 0 | 1 | 0 | 0 | 0 |
| 0 | 0 | 0 | 0 | 1 |

SYMMETRIC DUAL-SLOT DATA HASH METHOD AND NETWORK SWITCHING APPARATUS USING SAME

CROSS-REFERENCE TO RELATED APPLICATION

This application claims the priority benefit of Taiwan application Serial no. 090110664, filed May 03, 2001.

BACKGROUND OF THE INVENTION

1. Field of the Invention

This invention relates in general to a data hash method and a network switching apparatus using the same. More particularly, the invention provides a symmetric dual-slot data hash method and a network switching apparatus using the same.

2. Description of Related Art

To access the internet, a hardware interface responsible for tranceiving is required. In general, except the home users usually use modems to access the internet, other network systems are connected to each other by network cards. For example, many personal computers (PC) are connected to servers through the network cards, and then connected to the network through the servers. Therefore, the network card is a media, through which the PCs can be connected to the network.

FIG. 1 shows a schematic diagram that two PCs are connected via the network. As shown, the PC 130 and the PC 150 are connected by the network 100, i.e. the two PCs can communicate to each other to transfer data. Due to the limited bandwidth, prior to transmitting data, the data is divided into many small packets to facilitate data transmission. In each packet, a media access control (MAC) address of the PC is recorded for telling where the packet is transmitted from and where the packet is transmitted to in order to prevent the packet lost. Simply speaking, each network card in each PC records the MAC address of the PC, which is like an address number (the MAC address). When the data is transmitted through the network, the packets can be continuously transmitted to the correct destination according to the specified MAC address, such that the data can be surely transmitted.

FIG. 2 shows a schematic diagram of a packet. The packet 200 stores information of MAC address 210. In general, the MAC address information 210 contains a source MAC (SMAC) address 210a and a destination MAC (DMAC) 210b address, according to which the data transmission can be executed. Referring to FIGS. 1 and 2, if the PC 130 is at a port 13 and intends to transmit data to the PC 150 at a port 15 through the network 100, the PC 130 divides the data into a plurality of packets 200. In each packet 200, the MAC address information 210 shows that the SMAC address 210b is 130 (the source of the packet is the PC 130) and the DMAC address 210a is 150 (the destination of the packet is the PC 150). Then, a network switching device looks up an address table (not shown) according to the DMAC address 210a to know that the PC 150 is at the port 15, thereby the packet 200 is transmitted to the PC 150. As described above, prior to the data transmission, the address information of a remote PC must be found by referring to the address table. The network switching device has a memory to store such an address table for storing a plurality of MAC addresses to facilitate data transmission.

FIG. 3A shows a structure of an address table allocated in the memory. In the memory of each switching device, a particular memory area is allocated for the address table for storing the MAC address information of computers on the network. Because the address table 310 occupies a certain region of the memory 300, the size can be varied according to different demands, for example 4K or 8K etc. Taking a 4K address table as an example, the memory 300 can allocate 4K addresses (0 to 4K−1) to the address table 310 for storing the MAC address information. Therefore, the address table 310 has 4K entries for storing 4K different MAC address information respectively. For example, address 0 corresponds to the entry 0, address 1 corresponds to the entry 1, . . . , and address 4K−1 corresponds to the entry 4K−1. Namely, in the memory 300, the 4K entries correspond to 4K addresses 0 to 4K−1, respectively.

FIG. 3B shows a method for accessing the address table in FIG. 3A. Prior to writing a SMAC address to an entry, a CRC hash operation is performed to obtain a hash value. Next, find an address in the address table 310 according to the hash value, to store the SMAC address information. In order to map that the hash values to the 4K addresses, a 12-bit CRC hash operation is performed so that the obtained hash value has also 12 bits. According to the various hash values, 4K addresses can be mapped onto correspondingly. In practice, the SMAC address with 48 bits is used for calculating the hash value, and then the SMAC address information and the source port information are written to the corresponding entry to facilitate the table look-up.

For example, assume that a PC A is at port 5 and its SMAC address is A, a PC B is at port 7 and its SMAC address is B. After the PC A and the PC B are connected through the switching device, the switching device calculates a hash value for the SMAC address (A) of the PC A according to the CRC hash operation, for example, the hash value is 20. Afterwards, the switching device writes the SMAC address information of the PC A (A) and the source port (5) to the entry 20 of the address table. When the PC A intends to transmit a packet with SMAC=A and DMAC=B to the PC B, the switching device performs the CRC hash operation to the DMAC address (B) to obtain a hash value, for example 35. Then, an entry 35 is found according to the hash value 35, in which the source port (7) of the PC B has already been recorded. Accordingly, the packet can be transmitted to the port 7 to complete the packet transmission. It should be noticed that the hash values calculated from various 48-bits SMAC addresses by the 12 bit CRC hash operation are not one-to-one correspondence for those SMAC addresses. Namely, after the CRC hash operation, a 48 bit data is reduced to an expression of 12 bit hash value, which means that some information in the 48 bits disappear. Therefore, it is highly possible that two SMAC addresses may have the same hash value after the CRC hash operation. However, because each address in the address table can only store one MAC address information, one of the MAC addresses may be abandoned if two SMAC addresses have the same hash value, thereby causing data lost. To compensate the drawback, the conventional method makes the 4K addresses in the memory correspond to 2K buckets, which will be described in the following paragraph.

FIG. 4A shows a structure of a conventional dual-slot address table. Taking a 4K address table as an example, the 4K addresses (0 to 4K−1) are assigned to an address table 410. In the design, each entry has two slots: slot 0 and slot 1. Namely, 2K buckets can store 4K address data. It should be noticed that the address table 410 is a symmetric dual-slot address table because the address table 410 is composed of two slots having equal size. FIG. 4B shows a method for writing to the address table in FIG. 4A. As shown, after a SMAC address is operated by the CRC hash operation, the obtained hash value is 1K such that the address data is written to the entry 1K of the address table. However, there are tow slots corresponding to the hash value 1K, the address data is priorly written to the slot 0, rather than the slot 1. If there is another MAC address of the network card has the same hash vale of 1K after the 11 bit CRC hash operation, the later MAC address will be written to the slot 1 also corresponding to the hash value of 1K. Accordingly, the later MAC address data will not be lost. In short, when the MAC address is written to the corresponding slot, the slot 0 is first used for writing. If the slot 0 has stored data, then the data will be written to the slot 1. The advantage of this method is that even if two different SMAC addresses have the same hash value after the CRC hash operation, the two SMAC addresses can still be written to the same entry but different slots, thereby the address data will not be lost.

On the other hand, during the packet transmission, in order to ensure that the packet can be properly transmitted to the remote computer, the port number for the remote computer can be obtained according to the records of the DMAC address in the packet while the packet is transmitting. The method has been discussed above, and their details are omitted here. A hash value corresponding to the DMAC address can be found by performing the CRC hash operation. Under the dual-slot configuration, an address information corresponding to the hash value is first found in the address table, and the SMAC address information in the slot 0 corresponding the address is read to determine whether the DMAC and the SMAC addresses are matched. If matched, it means that the recorded source port in slot 0 is the destination of the packet, by which the packet can be transmitted. If not matched, the SMAC address information in the slot 1 corresponding the address is further read to determine whether the DMAC and the SMAC addresses are matched. If matched, it means that the recorded source port in slot 1 is the destination of the packet, by which the packet can be transmitted. However, if the SMAC addresses in the slot 0 and the slot 1 corresponding to the same hash value are not consistent to the DMAC address, the packet is then sent by the broadcast. It should be noticed that the read SMAC address information is not the whole 48 bits SMAC address, but only the significant bits of the SMAC address and the source port. For example, currently, the higher 37 bits (the MAC tag) in the SMAC address are stored, and the lower 11 bits in the SMAC address are not stored. The hash operation will not create that two different MAC addresses have the same hash value and the same MAC tag (MAC[47:11]), but different MAC[10:0]. To retrieve the SMAC address, the hash value and the MAC tag in the slot are operated. However, this mathematical operation is not the points of the invention, which is omitted here.

As described above, in order to prevent from losing one of the SMAC addresses having the same hash value, the address table can be divided into two parts to form two corresponding slots for each entry, so each entry in the address table corresponds to two slots. Therefore, two different MAC addresses having the same hash value are written to the slot 0 and the slot 1 respectively to prevent the data from lost. In addition, because the addresses of the address table correspond to the hash values and the range of the hash values is determined by the bit number of the CRC function, the size of the address table has to be power of 2, such as 2K, 4K, 8K, 16K, if the size of the address table is based on the unit of 1K ($2^{10}$). Accordingly, the size of the address table cannot be adjusted very flexible. In other word, the foregoing method cannot support an address table having a size of an integer multiple of 2. In U.S. Pat. No. 5,920,900, it provides a Hash-based translation method and apparatus with multiple level collision resolution. The conversion method uses a programmable hash technology of an input value to generate a hash value. If a collision occurs in a resolution table, a new resolution table is generated. This procedure is repeatedly performed until all input values are converted. However, this method is too complicated to be implemented by hardware.

In summary, the access method for conventional address table cannot support all the address table having a size of the integer multiple of 2, such as 6K, 10K. In addition, the memory in the switching device cannot be assigned flexibly.

SUMMARY OF THE INVENTION

According to the foregoing description, an object of this invention is to provide a symmetric dual-slot data hash method and a network switching apparatus using the same, such that the address table can support all table size of integer multiple of 2 to have a highest performance.

According to the above object(s), the invention provides a symmetric dual-slot data hash method, for a symmetric dual-slot address table having a first block and a second block for storing a plurality of MAC addresses. The size of the dual-slot address table is p×2m with m is an integer, and p is 2 or a prime because the hash address calculating method is suitable for any address table having a size of integer multiple of 2. The hash address comprises a higher address portion and a lower address portion. After the higher address portion and the lower address portion are found, they are combined to the hash address. First, a CRC hash operation is performed to the MAC address by using the m-bit CRC function to obtain a hash value. Next, the highest bit of the hash value is removed and the remained bits are used as the lower address portion of the hash address.

On the other hand, when calculating the higher address portion of the hash address, the highest bit of the hash value is used for replacing the m-th bit of the MAC address, and a dividend is set by counting t bits up based on the m-th bit of the MAC address. After the dividend is divided by a divisor p to obtain a remainder, the remainder is set as a higher address portion of the hash address. Finally, the higher address portion and the lower address portion are combined to obtain the hash address.

The invention further provides a network switching device having a plurality of ports. The network switching device receives a packet from a source port among the ports. The packet comprises a SMAC address and a DMAC address. The switching device comprises a memory and a forwarding device. The memory can be a DRAM, comprising a dual-slot address table having a first block and a second block for storing a plurality of MAC address. The size of the dual-slot address table is p×2m (m is an integer, and p is 2 or a prime). The forwarding device is coupled to the memory for forwarding the packet to a destination according to the DMAC address. The forwarding device uses a hash function to perform a hash operation to the SMAC address or the DMAC address to obtain a hash value having m bits. The highest address of the hash value is removed and the remained bits of the hash value are set as a lower address portion of a hash address. A dividend is set based on the m-th bit of the MAC address to count t bits up. The dividend is then divided by a divisor p to obtain a remainder to be set as a higher address portion of the hash address.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIG. 10 shows a mapping scheme for the hash address.

DESCRIPTION OF THE PREFERRED EMBODIMENT

The invention provides a data hash method capable of supporting an address table with a size of $p \times 2^m$, wherein m is a positive integer and p is 2 or a prime. For example, if 4K MAC addresses are required to write into an address table, the size of the address table can be set to 4K and the address table can be divided into two blocks each of which has a size of 2K. In this case, 4K can be expressed as $2 \times 2^{11}$ and therefore, m is 11 and p is 2. Additionally, if 10K MAC addresses are required to write into an address table, the size of the address table can be set to 10K and the address table can be divided into two blocks each of which has a size of 5K, in which 10K can be expressed as $5 \times 2^{11}$ and m is 11 and p is 5.

Figure 1:
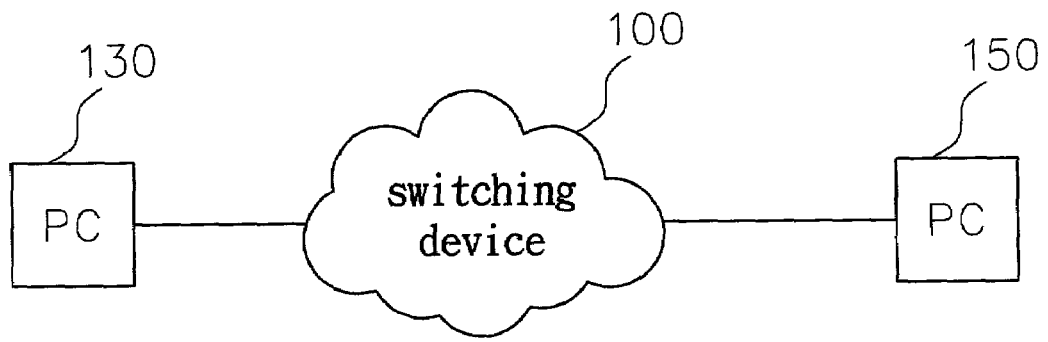
FIG. 1 is a schematic diagram that two computers are connected via a network.
Figure 2:
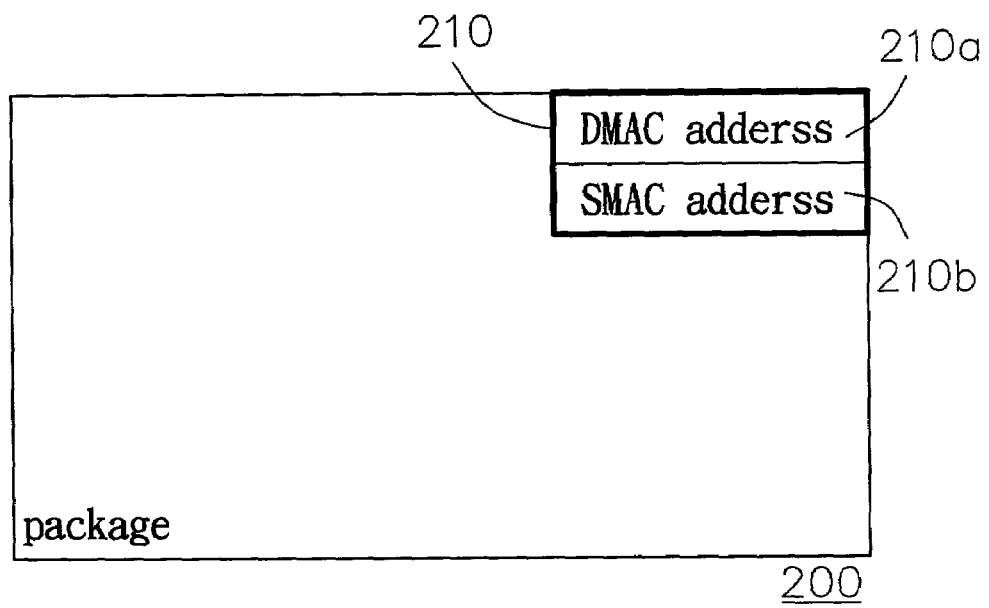
FIG. 2 schematically shows a packet example.
Figure 3A:
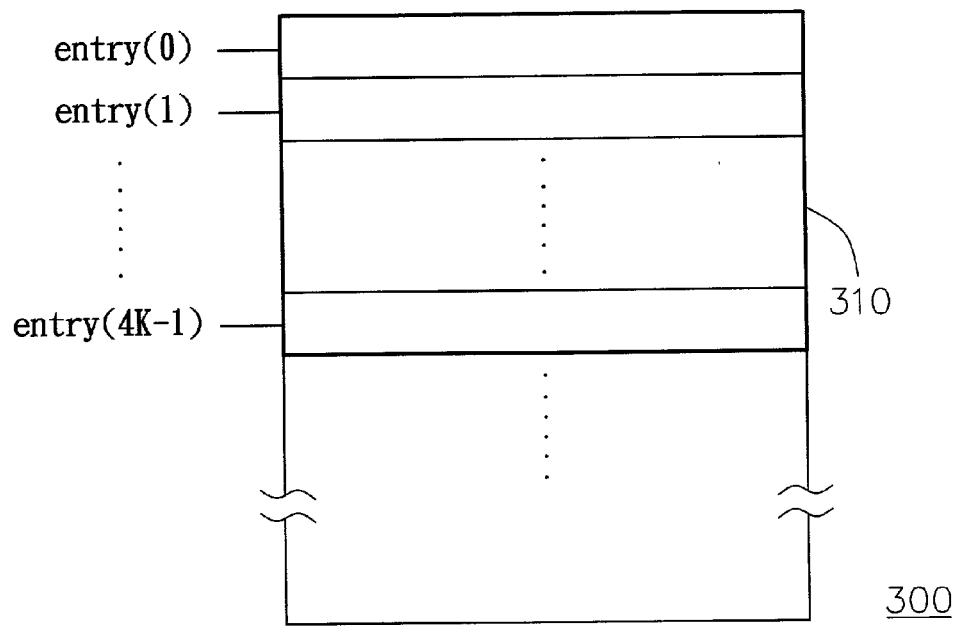
FIG. 3A shows a conventional address structure in a memory.
Figure 3B:
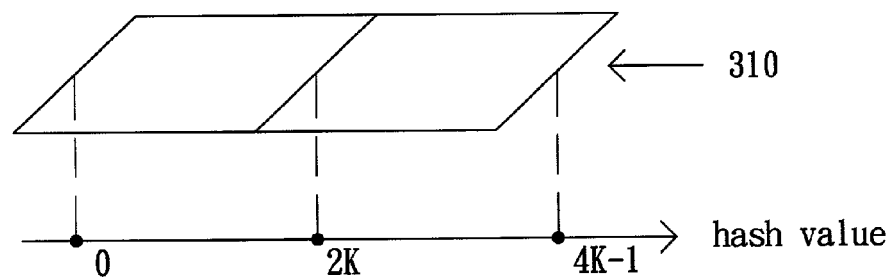
FIG. 3B shows a conventional method for writing to the address table in FIG. 3A.
Figure 4A:
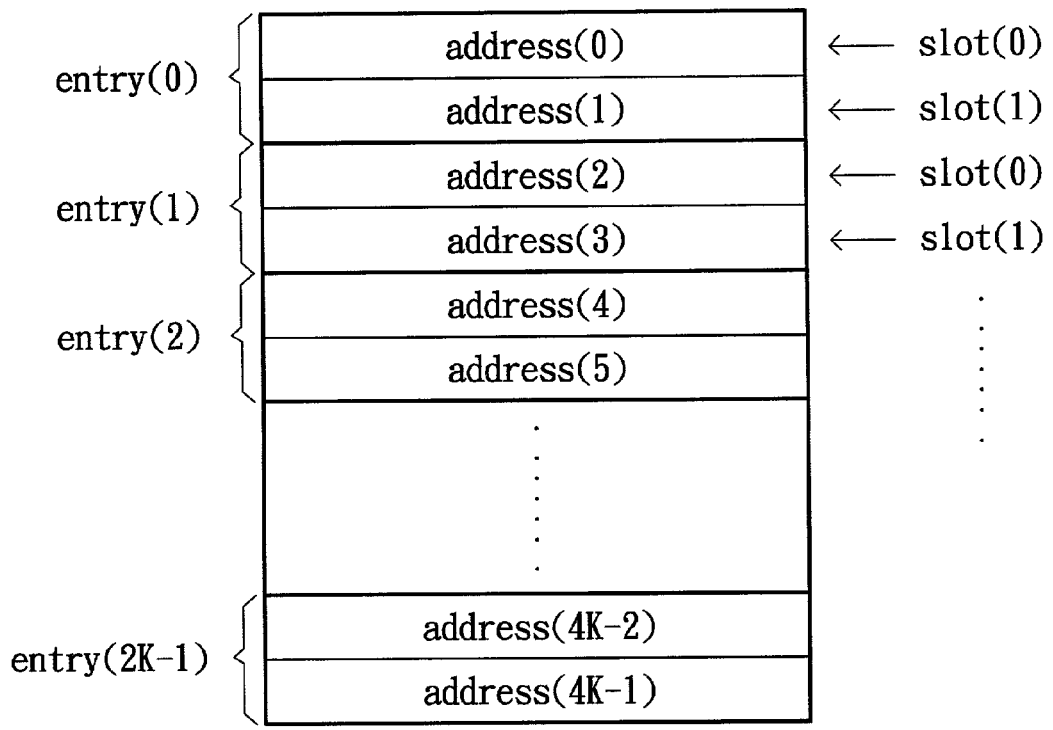
FIG. 4A shows a conventional address structure in a memory.
Figure 4B:
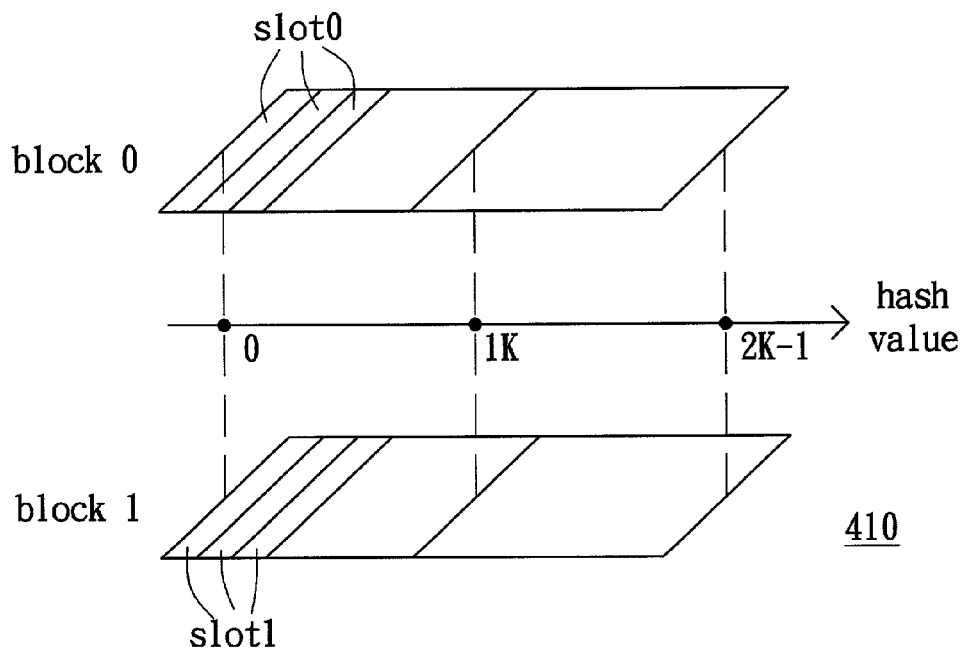
FIG. 4B shows a conventional method for writing to the address table in FIG. 4A
Figure 5A:
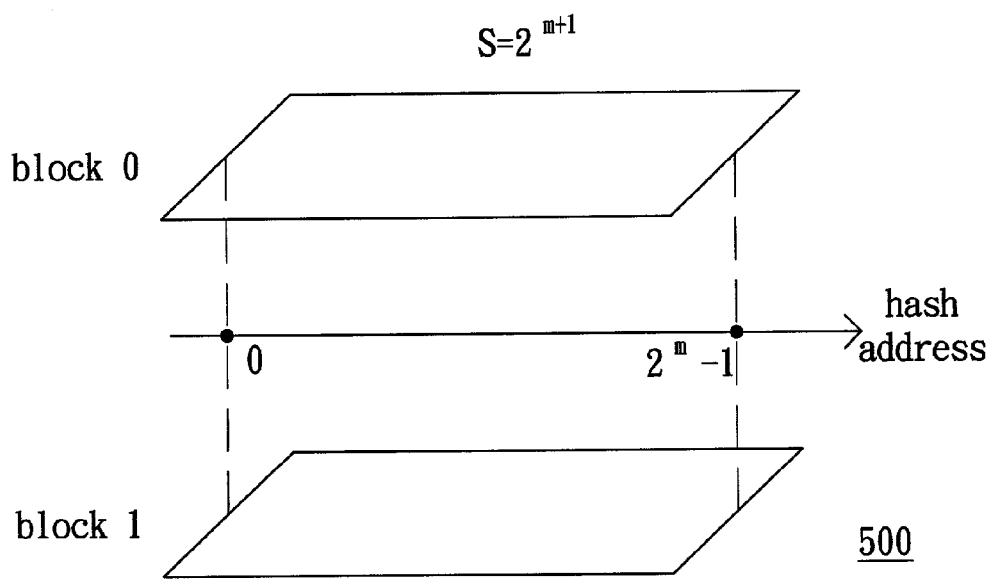
FIG. 5A shows a mapping manner of a hash address for a symmetric dual-slot address table with a size of $2^{m+1}$.
Figure 5B:
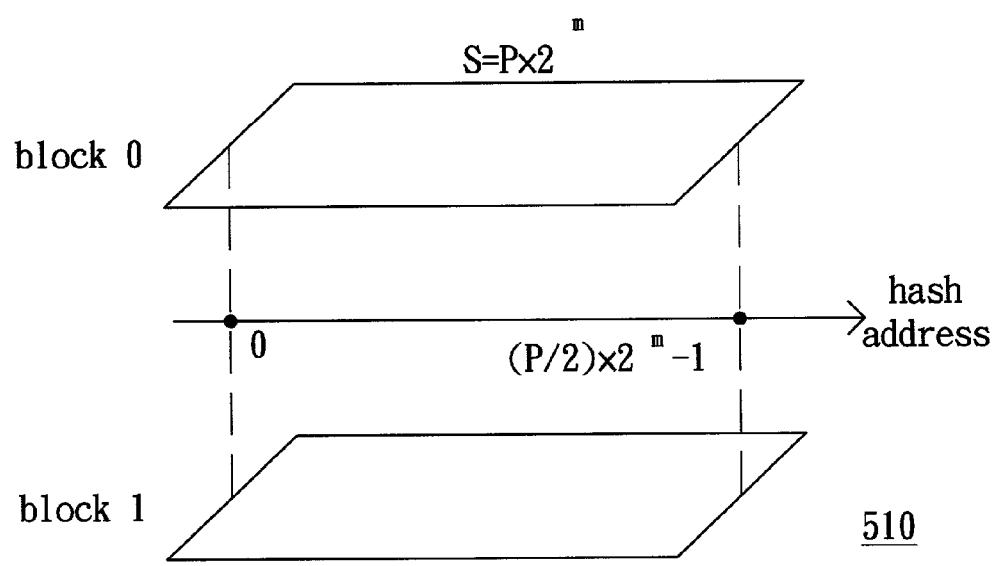
FIG. 5B shows a mapping manner of hash addresses for a symmetric dual-slot address table with a size of $p \times 2^m$ according to one embodiment of the present invention.

FIG. 5B shows a mapping manner of hash addresses for a symmetric dual-slot address table with a size of $p \times 2^m$. Referring to FIG. 5B, an address table 510 containing block 0 and block 1, each of which has the same size, is defined herein as a symmetric dual-slot address table. Because the size of the symmetric dual-slot address table 510 is $p \times 2^m$ and each of the block 0 and block 1 has the same size, the size of the block 0 or block 1 is $(p/2) \times 2^m$. For example, if the address table has a size of 6K, then each block of the address table 510 has a size of 3K and corresponds to addresses 0~(3K−1). It should be noticed a plurality of addresses in the block 0 and block 1 is not directly specified by the hash values as the prior arts. According to the invention, new hash addresses are generated according to the hash values.

For example, MAC addresses are calculated by a m-bit CRC function. In the following description, mapping the addresses onto the address tables of different sizes is discussed.

First Embodiment of this Invention

Figures 6, 7:
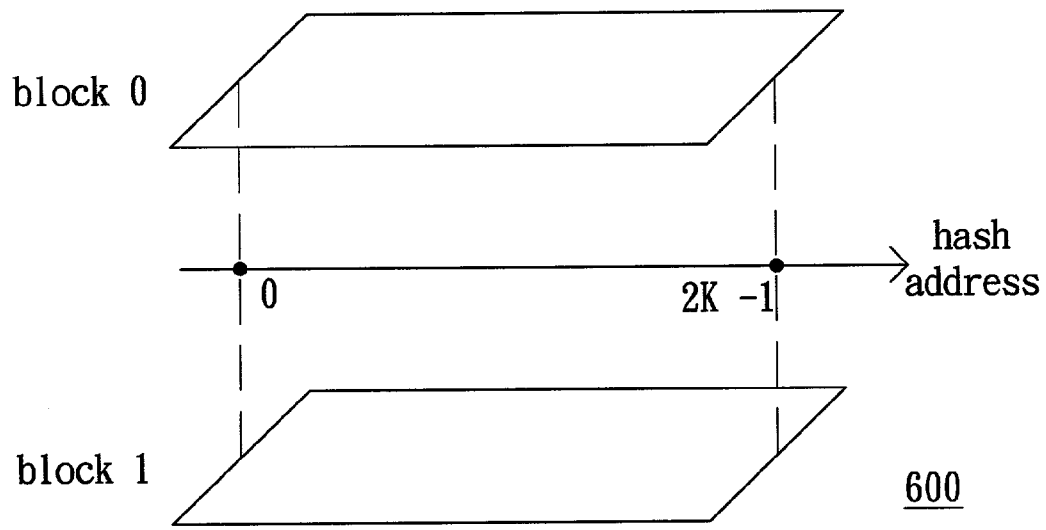
FIG. 6 shows a mapping manner between the hash addresses and the 4K address table according to the invention.
FIG. 7 shows a table of the bit variation when the MAC address increases from 0 to (4K−1) according to the invention.

The first embodiment illustrates mapping a plurality of hash addresses onto a symmetric dual-slot having a size of 4K. Because 4K can be expressed as $2 \times 2^{11}$, so p=2 and m=11, and therefore a 11-bit CRC function (CRC11) is used for calculating the hash addresses. FIG. 6 shows a mapping manner between the hash addresses and the 4K address table. Since the size of the address table 600 is 4K, the sizes of the block 0 and block 1 are both 2K and the corresponding hash addresses are 0~(2K−1). Accordingly, the hash addresses need 11 bits to express. According to the CRC hash principle, if the CRC11 hash operation is performed to 2K ($2^{11}$) continuous MAC addresses, the obtained hash values then range from 0 to 2K−1. Therefore, assume that the MAC address is increased from 0 to 4K−1, and then the CRC hash operation is performed to the MAC address by using the CRC11 to obtain the hash values. Thereafter, when the obtained hash values are written to the address table 600, the 2K addresses of the block 0 are completely one-to-one mapped as the MAC address is increased from 0 to 2K−1. If the MAC address is increased above 2K, the hash values will be repeated due to the CRC11 operation. Thus, the subsequent MAC addresses are one-to-one mapped onto the block 1. Namely, the MAC addresses 0~(2K−1) are mapped onto the block 0 and the MAC addresses 2K~(4K−1) are mapped onto the block 1.

FIG. 7 shows a table of the bit variation when the MAC address increases from 0 to (4K−1). For example, the lower ten bits, i.e., MAC[9:0], correspond to 0~(1K−1). Therefore, if the MAC address is increased from 0 to 4K−1, the variation for each bit of the MAC address is as shown in FIG. 7, in which the first row of the MAC address ranges from 0 to 1K−1, the second row ranges from 1K to 2K−1, the third row ranges from 2K to 3K−1, and the fourth row ranges from 3K to 4K−1. When hashing the MAC addresses, the CRC11 is used for generating 2K hash addresses for all MAC addresses because the symmetric dual-slot address table has the size of 4K and contains two blocks having the same size.

Figure 8A:
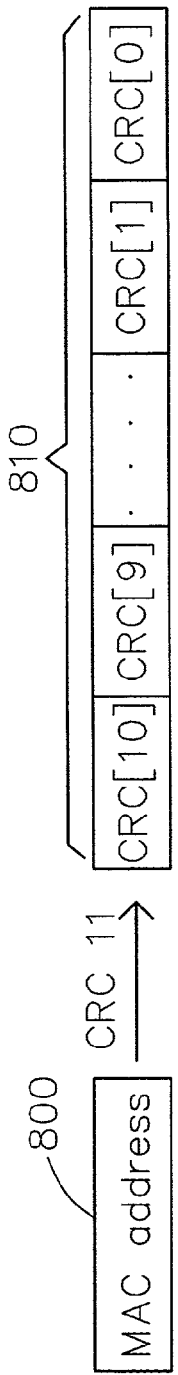
FIG. 8A shows a schematic diagram that the CRC operation is performed for the MAC address to generate the corresponding hash value according to the invention.

FIG. 8A shows a schematic diagram that the CRC operation is performed for one MAC address to generate the hash value. 4K data with different MAC addresses can be accessed using the 4K address table of this invention. The CRC11 is used for calculating the hash values corresponding to the MAC addresses because the size of the address table is $2^{11+1}$. The CRC hash operation is performed to the MAC address 800 by the CRC11 to obtain the hash value 810. The hash value 810 has also 11 bits because of the CRC11, which are CRC[0], CRC[1], . . . , CRC[10], as shown in FIG. 8A.

Figure 8B:
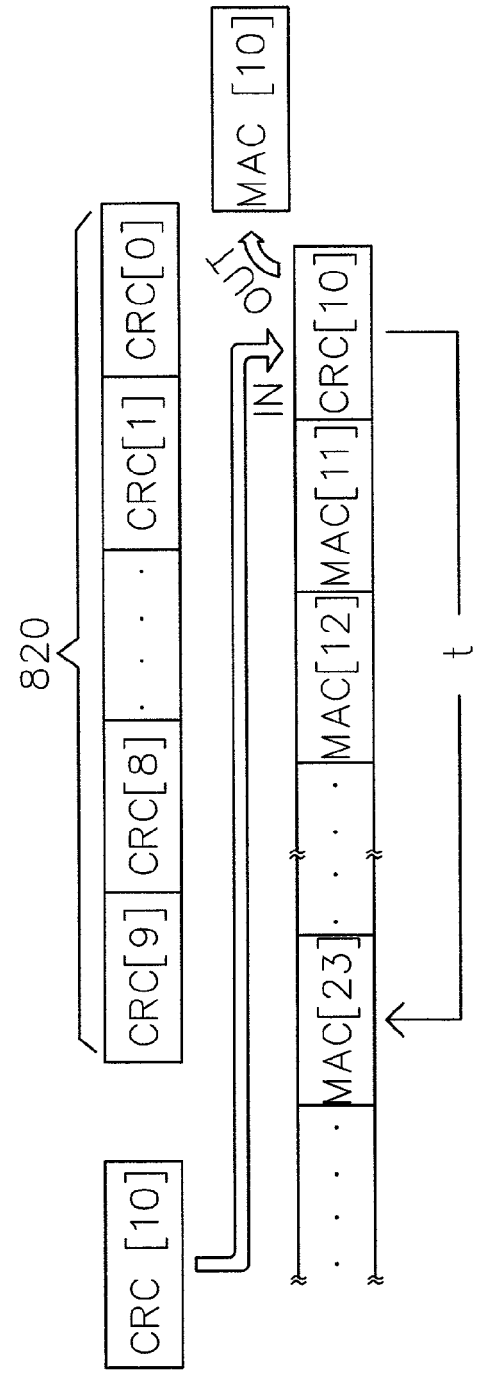
FIG. 8B shows a diagram of the generation of the lower address portion and the dividend by calculating the hash value in FIG. 8A.
Figure 8C:
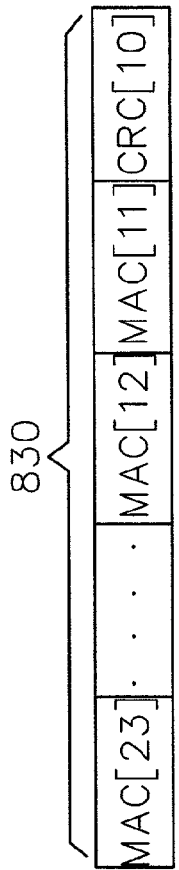
FIG. 8C shows the structure of the dividend in FIG. 8B.

On the other hand, when the hash address is generated from the hash value, the hash address to be calculated is divided into a higher address portion part and a lower address portion part. After the higher address portion part and the lower address portion part are derived respectively, they are then combined to obtain a complete hash address. The method for calculating the lower address portion part of the hash address is described first. If the highest bit of the hash value 810 is removed, i.e., the CRC[10] is removed, the remained bits of the hash value 810 is used as a lower address portion part 820 of the hash address, as shown in FIG. 8B. In addition, to calculate the higher address portion part of the hash address, the highest bit of the hash value 810 is used for replacing the same bit in the MAC address 800. In this example, MAC[10] is replaced by the CRC[10]. (t+1) Bits comprising t higher bits and this variable bit (CRC[10]) are set as a dividend 830, as shown in FIG. 8C. The parameter t can be designed on demand without special restriction. For example, 13 bits is counted up based on the CRC[10] to the MAC[23] as the dividend 830. Namely, 13 bits are counted up and the dividend 830 has 14 bits. The reason is that the MAC[23:0] can be randomly varied by a tester for testing switches.

Figure 8D:
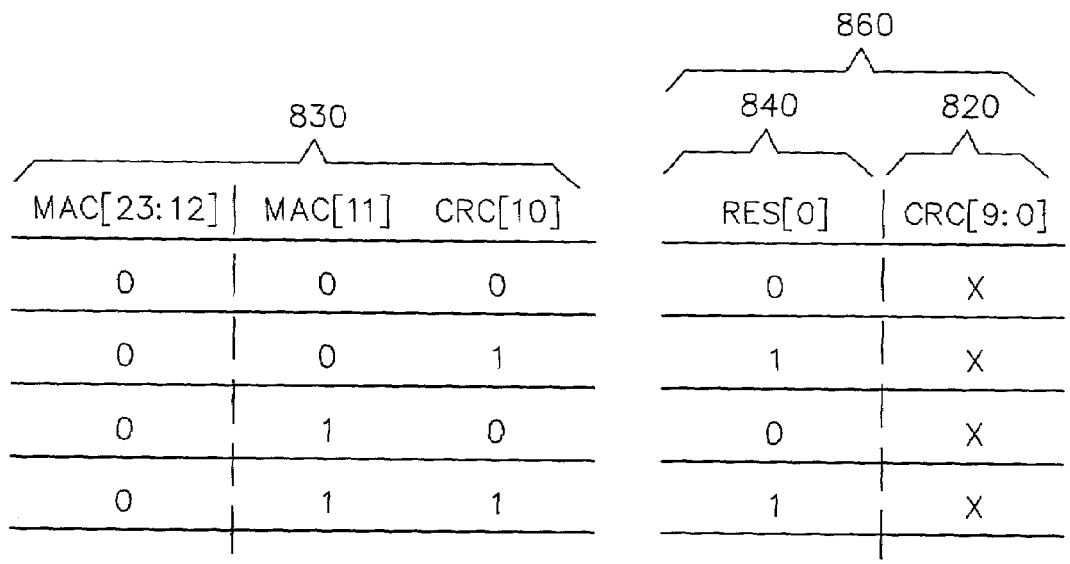
FIG. 8D shows the structure of the hash address according to the invention.

FIG. 8D shows a relationship between the higher address portion part of the MAC address and the hash address. Referring to FIG. 8D, after the dividend 830 is determined, a remainder is derived from the dividend 830 using 2 as a divisor. This remainder is set as a higher address portion 840 of the hash address. Because the remainder obtained by dividing the dividend 830 by 2 is 0 or 1, only one bit is required to express the higher address portion 840, for example RES[0]. As shown, in the first row, because the dividend 830 is 0 and the remainder after dividing by 2 is 0, the higher address portion 840 is 0. In the second row, because the dividend 830 is 1 and the remainder after dividing by 2 is 1, the higher address portion 840 is 1. In the third row, because the dividend 830 is 0 and the remainder after dividing by 2 is 1, the higher address portion 840 is 0. In the fourth row, because the dividend 830 is 1 and the remainder after dividing by 2 is 1, the higher address portion 840 is 1. Finally, the completed hash address 860 can therefore be obtained by combining the lower address portion 820 and the higher address portion 840 at each row. On the other hand, all the numbers upper than the twelfth bit, i.e. MAC[23:11], at the first and the second rows in FIG. 8D are 0. These two rows map their MAC addresses from 0 to 2K−1 since the divisors 830 is defined according to the MAC address. As shown, it is clear that the hash addresses 860 corresponding to the first and the second rows also range from 0 to 2K−1. Therefore, when the MAC address is increased from 0 to 2K−1, the block 0 can be completely mapped so the MAC address information for these MAC addresses is written to the block 0 according to the hash addresses 860 corresponding to the MAC addresses.

In addition, the twelfth bit MAC[11] for the third and the fourth rows of the divisors 830 is 1 and the high bits upper than the thirteenth bit, i.e. MAC[23:12] at the third and the fourth rows are 0, and therefore these two rows represent that the MAC addresses range from 2K to 4K−1. As shown, it is clear that the hash addresses 860 corresponding to the third and the fourth rows range from 0 to 2K−1. Since the block 0 corresponding to the hash addresses 0~(2K−1) is fully mapped, the block 1 is completely mapped when the MAC addresses are written to the block 1 according to the hash addresses 860 corresponding to the MAC addresses.

Second Embodiment of this Invention

The second embodiment discloses generating hash addresses corresponding to a symmetric dual-slot having a size of 10K. Because 10K can be expressed as $5 \times 2^{11}$, so p=5 and m=11, and therefore a 11-bit CRC function (CRC11) is used for calculating the hash addresses.

Figure 9:
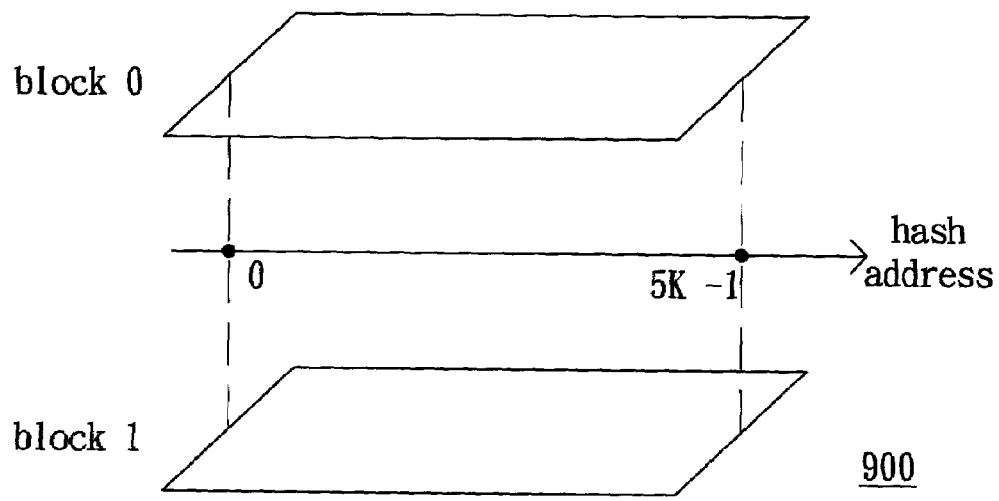
FIG. 9 shows a mapping manner between the hash addresses and the 10K address table.

FIG. 9 shows a mapping manner between the hash addresses and the 10K address table. As shown the address table 900 has a size of 10K, and therefore, the sizes of the block 0 and block 1 are both 5K and the corresponding hash addresses are 0~(5K−1). Accordingly, the hash addresses need 13 bits to express because the hash addresses range from 0 to 5K−1. If the CRC hash operation is performed to the MAC addresses by using the CRC11, the obtained hash value only contains 11 bits. However, 13 bits are required to completely map from 0 to 5K−1. As the MAC address is increased from 0 to 10K−1, the MAC addresses will be written to the block 0 and the block 1 according to their corresponding hash addresses.

Similarly, the hash address is derived according to the MAC address by using the CRC11. Then, the highest bit CRC[10] of the hash value is removed, and the remained bits are used as the lower address portion of the hash address. The CRC[10] replaces the bit MAC[10] of the MAC address. Bits including the variable bit (CRC[10]) and its t higher bits are set as a dividend. Till now, the process is similar to the first embodiment, which will not be described in detail. For a consistent description, the numerals for the dividend and the lower address portion of the hash address are the same as those used in FIGS. 8A to 8C.

FIG. 10 shows a mapping scheme for the hash address. Since both of the block 0 and the block 1 have the same size of 5K, each block should map the hash addresses ranging from 0 to 5K−1. In other words, 13 bits are required to express the hash address. However, the lower address portion 820 has 10 bits, and therefore the higher address portion of the hash address has 3 bits. After the dividend 830 is divided by a divisor p, the remainder is set as the higher address portion. Because the size of each block is 5K, 5 is used as a divisor to calculate the remainder. Taking the first row as an example, 3 bits are required to express the higher address portion 1400 because the remainder of the dividend 830 divided by 5 can be 0, 1, 2, 3, or 4. For example, the higher address portion 1400 includes RES[2], RES[1] and RES[0], as shown. In the first row, the dividend 830 is 0, and its remainder is 0 after divided by 5, so that the higher address portion 1400 is 0. In the second row, the dividend 830 is 1, and its remainder is 1 after divided by 5, so that the higher address portion 1400 is 1. In the third row, the dividend 830 is 2, and its remainder is 2 after divided by 5, so that the higher address portion 1400 is 2. In the fourth row, the dividend 830 is 3, and its remainder is 3 after divided by 5, so that the higher address portion 1400 is 3. In the fifth row, the dividend 830 is 4, and its remainder is 4 after divided by 5, so that the higher address portion 1400 is 4. In the sixth row, the dividend 830 is 5, and its remainder is 0 after divided by 5, so that the higher address portion 1400 is 0. In the seventh row, the dividend 830 is 6, and its remainder is 1 after divided by 5, so that the higher address portion 1400 is 1. In the eighth row, the dividend 830 is 7, and its remainder is 2 after divided by 5, so that the higher address portion 1400 is 2. In the ninth row, the dividend 830 is 8, and its remainder is 3 after divided by 5, so that the higher address portion 1400 is 3. In the tenth row, the dividend 830 is 9, and its remainder is 4 after divided by 5, so that the higher address portion 1400 is 4. Finally, the hash address 1600 can be obtained by combining the lower address portion 820 and the higher address portion 1400 for each row.

In addition, the bits upper than the twelfth bit of all the divisors 830, i.e. MAC[23:11], at the first and the second rows are 0, and then the MAC addresses for the two rows range from 0 to 2K−1. As clearly shown, when the obtained hash value is between 0 to 2K−1, the CRC[10] is 0 and the dividend 830 is 0 so that the higher address portion 1400 is also 0, thereby the hash address ranges from 0 to 1K−1 as show in the first row. When the obtained hash value is between 1K to 2K−1, the CRC[10] is 1 and the dividend 830 is 1 so that the higher address portion 1400 is also 1, thereby the hash address ranges from 1K to 2K−1 as show in the second row. On the other hand, when the MAC address is increased from 0 to 2K−1, the corresponding hash address 1600 also ranges from 0 to 2K−1. Therefore, when the MAC address is increased from 0 to 2K−1, the address 0 to 2K−1 in the block 0 can be completely filled if the MAC addresses are written to the block 0 according to the hash addresses 860 corresponding to the MAC addresses.

In addition, all bits upper than the thirteenth bit of the divisors 830, i.e. MAC[23:12], at the third and the fourth rows are 0 and the twelfth bit is 1, then the two rows represent that the MAC addresses range from 2K to 4K−1. As clearly shown, when the obtained hash value is between 0 to 1K−1, the CRC[10] is 0 and the dividend 830 is 2 so that the higher address portion 1400 is also 2, thereby the hash address ranges from 2K to 3K−1 as shown in the third row. When the obtained hash value is between 1K to 2K−1, the CRC[10] is 1 and the dividend 830 is 3 so that the higher address portion 1400 is also 3, thereby the hash address ranges from 3K to 4K−1 as show in the fourth row. On the other hand, when the MAC address is increased from 2K to 4K−1, the corresponding hash address 1600 also ranges from 2K to 4K−1. Therefore, when the MAC address is increased from 2K to 4K−1, the addresses 2K to 4K−1 in the block 0 can be completely filled if the MAC addresses are written to the block 0 according to the hash addresses 1600 corresponding to the MAC addresses.

In addition, all bits upper than the fourteenth bit of the divisors 830, i.e. MAC[23:13], at the fifth and the sixth rows are 0, the thirteenth bit is 1 and the twelfth bit is 0, then the two rows represent that the MAC addresses range from 4K to 6K−1. As clearly shown, when the obtained hash value is between 0 to 1K−1, the CRC[10] is 0 and the dividend 830 is 4 so that the higher address portion 1400 is also 4, thereby the hash address ranges from 4K to 5K−1 as show in the fifth row. The addresses 4K to 5K−1 in the block 0 are completely mapped if the MAC addresses are written to the block 0 according to the hash addresses 1600 corresponding to the MAC addresses. When the obtained hash value is between 1K to 2K−1, the CRC[10] is 1 and the dividend 830 is 5 so that the higher address portion 1400 is also 0, thereby the hash address ranges from 0 to 1K−1 as show in the sixth row. Because the addresses 0 to 1K−1 in the block 0 are completely mapped, the MAC addresses corresponding to the hash addresses 1600 are written to the addresses 0 to 1K−1 in the block 1.

Next, because all access entries in the block 0 are full, the MAC addresses will be written to the block 1 when the MAC address is continuously increased. Taking the seventh and the eighth rows as examples, all bits upper than the fourteenth bit of the divisors 830, i.e. MAC[23:13], at the seventh and the eighth rows are 0 and the thirteenth and twelfth bits are 1, then the two rows represent that the MAC addresses range from 6K to 8K−1. As clearly shown, when the obtained hash value is between 0 to 1K−1, the CRC[10] is 0 and the remainder becomes 1 so that the higher address portion 1400 is also 1, thereby the hash address ranges from 1K to 2K−1 as show in the seventh row. When the obtained hash value is between 1K to 2K−1, the CRC[10] is 1 and the remainder becomes 2 so that the higher address portion 1400 is also 2, thereby the hash address ranges from 2K to 3K−1 as show in the eighth row. In other words, when the MAC address is increased from 6K to 8K−1, the corresponding hash address 1600 also ranges from 1K to 3K−1. Therefore, when the MAC address is increased from 6K to 8K−1, the addresses 1K to 3K−1 in the block 1 can be completely filled if the MAC addresses are written to the block 1 according to the hash addresses 1600 corresponding to the MAC addresses.

In addition, all bits upper than the fifteenth bit of the divisors 830, i.e. MAC[23:14], at the ninth and the tenth rows are 0, the fourteenth bit is 1 and the thirteenth and twelfth bits are 0, then the two rows represent that the MAC addresses range from 8K to 10K−1. As clearly shown, when the obtained hash value is between 0 to 1K−1, the CRC[10] is 0 and the dividend 830 is 3 so that the higher address portion 1400 is also 3, thereby the hash address ranges from 3K to 4K−1 as show in the ninth row. When the obtained hash value is between 1K to 2K−1, the CRC[10] is 1 and the dividend 830 is 4 so that the higher address portion 1400 is also 4, thereby the hash address ranges from 4K to 5K−1 as show in the tenth row. In other words , when the MAC address is increased from 8K to 10K−1, the corresponding hash address 1600 ranges from 3K to 5K−1. Therefore, when the MAC address is increased from 8K to 10K−1, the addresses 3K to 5K−1 in the block 1 can be completely filled if the MAC addresses are written to the block 1 according to the hash addresses 1600 corresponding to the MAC addresses.

It should be noticed that the MAC address is sequentially increased to explain the mapping scheme of the hash address. However, this explanation is only used for proving that all MAC addresses can be written to the address table uniformly, rather than used for limiting the scope of the invention in practice. In fact, the MAC address does not require to be written to the address table in such a manner. It is well known that the received MAC addresses have no sequence. However, according to the invention, the first received MAC address is written to the block 0 according to its hash address. Afterwards, if another received MAC address corresponds to the same hash address, then this MAC address will be written to the block 1, by which all MAC addresses are written to the two blocks. Because the size of the address table and the number of the MAC addresses are complete the same, the utilizing rate of the address table can be 100%.

Furthermore, the dividend is determined by using the highest bit of the hash value to replace the same bit of the MAC address and then based on this bit to count up by t bits to obtain the dividend. In the embodiment, 13 is used as an example for t, but t is not necessary to be 13. As the dividend is determined, the invention requires that only if the remainder of the dividend divided by the divisor can comply with the bit number of the higher address portion of the hash address.

As described above, the symmetric dual-slot address table of the invention can be applied to a network switching device, i.e., the invention also provides a network switching device having a plurality of ports. The network switching device receives a packet from a source port among the ports. The packet comprises a SMAC address and a DMAC address. The switching device comprises a memory and a forwarding device. The memory preferably is SRAM, comprising a dual-slot address table having a first block and a second block for storing a plurality of MAC addresses. The size of the dual-slot address table is $p \times 2^m$ (m is an integer, and p is 2 or a prime). The forwarding device is coupled to the memory for forwarding the packet to a destination according to the DMAC address. The forwarding device uses a hash function to perform a hash operation to the SMAC address or the DMAC address to obtain a hash value having m bits. The highest bit of the hash value is removed and the remained bits of the hash value are set as a lower address portion of a hash address. A dividend is set based on the highest bit of the hash value and t upper bits by counting t bits up from the m-th bit of the MAC address. The dividend is then divided by a divisor p to obtain a remainder to be set as a higher address portion of the hash address.

It should be noted that we can write a MAC tag, i.e. MAC address information, into the SRAM for a MAC address instead of the whole MAC address. Since the position where the MAC tag is written into contains the associated hash address information, only the MAC tag is required to obtain its whole MAC address. Furthermore, the parameters used in the foregoing embodiments are only examples, not used to limit the scope of the invention. Persons skilled in this art can adjust or modify the parameters to achieve any similar function of the invention.

According to the embodiments of the invention, the data hash method and its related network switching apparatus have following advantages. The address table can be completely used to have a highest performance. The address table of the invention can support all table size of integer multiple of 2 conveniently. In addition, the address table according to the invention can be used more uniformly. The invention also provides a switching apparatus capable of supporting address tables with various sizes, which is more elastic and selectable to the client.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What claimed is:

1. A symmetric dual-slot data hash method, for a symmetric dual-slot address table having a first block and a second block for storing a plurality of MAC addresses, wherein the size of the dual-slot address table is p×2m with m is an integer, and p is 2 or a prime, the method comprising steps of:
   using a hash function to perform a hash operation to a MAC address to obtain a hash value having m bits,
   removing a highest bit of the hash value, and remained bits of the hash value being set as a lower address portion of a hash address,
   setting a dividend by counting t bits up based on the m-th bit of the MAC address; and
   dividing the dividend by a divisor p to obtain a remainder to be set as a higher address portion of the hash address.

2. The method of claim 1, wherein t is an integer smaller than 37.

3. The method of claim 2, wherein t is 13.

4. The method of claim 1, wherein m is 11.

5. The method claim 1, wherein the hash function is a CRC function.

6. The method of claim 5, wherein the CRC function has m bits.

7. The method of claim 1, wherein the size of the symmetric dual-slot address table is 6K.

8. The method of claim 1, wherein the size of the symmetric dual-slot address table is 10K.

9. The method of claim 1, wherein in the step of setting a dividend by counting t bits up based on the m-th bit of the MAC address, the highest bit of the hash value is set as the m-th bit of the MAC address, and the dividend is set by counting t bits up based on the m-th bit of the MAC address.

10. A network switching device having a plurality of ports, wherein the network switching device receives a packet from a source port among the ports, the packet comprises a SMAC address and a DMAC address, the network switching device comprising:
    a memory, comprising a symmetric dual-slot address table having a first block and a second block for storing a plurality of MAC addresses, wherein the size of the dual-slot address table is p×2m with m is an integer, and p is a prime; and
    a forwarding device, coupled to the memory for forwarding the packet to a destination port among the ports according to the DMAC address, wherein the forwarding device uses a hash function to perform a hash operation to the SMAC address or the DMAC address to obtain a hash value having m bits, the highest bit of the hash value is removed and the remained bits of the hash value are set as a lower address portion of a hash address, a dividend is set based on the m-th bit of the MAC address to count t bits up, and the dividend is then divided by a divisor p to obtain a remainder to be set as a higher address portion of the hash address.

11. The network switching device of claim 10, wherein m is 11.

12. The network switching device of claim 10, wherein the hash function is a CRC function.

13. The network switching device of claim 12, wherein the CRC function has m bits.

14. The network switching device of claim 10, wherein the size of the symmetric dual-slot address table is 6K.

15. The network switching device of claim 10, wherein the size of the symmetric dual-slot address table is 10K.

16. The network switching device of claim 10, wherein the highest bit of the hash value is set as the m-th bit of the MAC address, and the dividend is set by counting t bits up based on the m-th bit of the MAC address.

17. The network switching device of claim 10, wherein the memory includes a dynamic random access memory.

18. A symmetric dual-slot data hash method, for a symmetric dual-slot address table having a first block and a second block for storing a plurality of MAC addresses, wherein the size of the dual-slot address table is p×2m with m is an integer, and p is 2 or a prime, the method comprising steps of:
    using a hash function to perform a hash operation to a MAC address to obtain a hash value having m bits,
    removing a high bit portion of the hash value, and remained bits of the hash value being set as a lower address portion of a hash address,
    setting a dividend by counting t bits up based on the m-th bit of the MAC address; and
    dividing the dividend by a divisor p to obtain a remainder to be set as a higher address portion of the hash address.

* * * * *